United States Patent
Katikaneni et al.

(10) Patent No.: US 12,240,755 B2
(45) Date of Patent: Mar. 4, 2025

(54) METHOD FOR PRODUCING COMPRESSED HYDROGEN USING ELECTROCHEMICAL SYSTEMS

(71) Applicants: Saudi Arabian Oil Company, Dhahran (SA); Korea Advanced Institute of Science and Technology, Daejeon (KR)

(72) Inventors: Sai P. Katikaneni, Dhahran (SA); Kunho Lee, Dhahran (SA); Joongmyeon Bae, Daejeon (KR); WooChul Jung, Daejeon (KR)

(73) Assignees: Saudi Arabian Oil Company, Dhahran (SA); Korea Advanced Institute of Science and Technology, Daejeon (KR)

(*) Notice: Subject to any disclaimer, the term of this patent is extended or adjusted under 35 U.S.C. 154(b) by 851 days.

(21) Appl. No.: 17/367,905

(22) Filed: Jul. 6, 2021

(65) Prior Publication Data

US 2022/0002151 A1  Jan. 6, 2022

Related U.S. Application Data

(60) Provisional application No. 63/048,264, filed on Jul. 6, 2020.

(51) Int. Cl.
*C01B 3/04* (2006.01)
*C25B 1/02* (2006.01)
(Continued)

(52) U.S. Cl.
CPC ............... *C01B 3/047* (2013.01); *C25B 1/02* (2013.01); *C25B 9/17* (2021.01); *C25B 11/061* (2021.01); *C25B 11/0773* (2021.01)

(58) Field of Classification Search
None
See application file for complete search history.

(56) References Cited

U.S. PATENT DOCUMENTS

| | | | |
|---|---|---|---|
| 8,034,499 B2 | 10/2011 | Grieve et al. | |
| 9,583,778 B2 | 2/2017 | Schaevitz et al. | |
| (Continued) | | | |

FOREIGN PATENT DOCUMENTS

| | | |
|---|---|---|
| CN | 106868529 A | 6/2017 |
| EP | 0972855 A1 | 1/2000 |
| (Continued) | | |

OTHER PUBLICATIONS

Shy et al., A pressurized ammonia-fueled anode-supported solid oxide fuel cells: Powder performance and electrochemical impedance measurements, Journal of power sources, 2018 (Year: 2018).*

(Continued)

*Primary Examiner* — Coris Fung
*Assistant Examiner* — Keling Zhang
(74) *Attorney, Agent, or Firm* — DINSMORE & SHOHL LLP

(57) ABSTRACT

According to embodiments of the present disclosure, a method of producing hydrogen in a fuel cell includes passing ammonia under pressure to an anode of the fuel cell, where the ammonia is decomposed into nitrogen gas and protons. The fuel cell comprises a cathode, the anode, and a proton-conducting electrolyte between the anode and the cathode. The anode includes an ammonia decomposition catalyst. The method further includes passing the purging the nitrogen from the anode, passing the protons through the proton-conducting electrolyte to the cathode, and passing the electrons from the anode to the cathode, wherein the protons and the electrons react to produce substantially pure hydrogen gas under pressure.

11 Claims, 2 Drawing Sheets

(51) Int. Cl.
 C25B 9/17 (2021.01)
 C25B 11/061 (2021.01)
 C25B 11/077 (2021.01)

(56) References Cited

U.S. PATENT DOCUMENTS

| | | |
|---|---|---|
| 2009/0286125 A1 | 11/2009 | Setlock et al. |
| 2015/0147677 A1 | 5/2015 | Barnett et al. |
| 2017/0317371 A1 | 11/2017 | Higashino et al. |
| 2018/0342739 A1 | 11/2018 | Hughes |
| 2019/0040535 A1 | 2/2019 | MacFarlane et al. |
| 2019/0051920 A1 | 2/2019 | Pan et al. |

FOREIGN PATENT DOCUMENTS

| | | |
|---|---|---|
| GB | 2393320 A | 3/2004 |
| JP | 2005272856 A | 10/2005 |
| JP | 2007115492 A | 5/2007 |
| JP | 2008501216 A | 1/2008 |
| JP | 2013085999 A | 5/2013 |
| JP | 2013209685 A | 10/2013 |
| JP | 5812513 B2 | 11/2015 |
| JP | 5939501 B2 | 6/2016 |
| JP | 2017050180 A | 3/2017 |
| JP | 2019502019 A | 1/2019 |
| JP | 2019026936 A | 2/2019 |
| JP | 2019509615 A | 4/2019 |
| WO | 2010051441 A1 | 5/2010 |
| WO | 2017115709 A1 | 7/2017 |
| WO | 2019066531 A1 | 4/2019 |

OTHER PUBLICATIONS

Pelletier et al., Ammonia fuel cell using doped barium cerate proton conducting solid electrolytes, Journal of Power Sources, 2005 (Year: 2005).*
Seidler et al., Pressurized solid oxide fuel cells: Experimental studies and modeling, Journal of Power Sources, 2011 (Year: 2011).*
Afif et al., "Ammonia-fed fuel cells: a comprehensive review", Renewable and Sustainable Energy Reviews, vol. 60, pp. 822-835, 2016.
Amar et al., "Electrochemical synthesis of ammonia based on a carbonate-oxide composite electrolyte", Solid State Ionics, vol. 182, pp. 133-138, 2011.
Amar et al., "Solid-State electrochemical synthesis of ammonia: a review", J. Solid State Electrochem, vol. 15, pp. 1845-1860, 2011.
Amar, et al., "Electrochemical synthesis of ammonia from wet nitrogen using La0.6Sr0.4FeO3-δ-Ce0.8Gd0.18Ca0.02O2-δ composite cathode", Royal Society of Chemistry, vol. 4, pp. 18749-18754, 2014.
Cacho-Bailo et al., "ZIF-8 continuous membrane on porous polysulfone for hydrogen separation", Journal of Membrane Science, vol. 464, pp. 119-126, 2014.
Cinti et al., "SOFC operating with ammonia: Stack test and system analysis", International Journal of Hydrogen Energy, vol. 41, pp. 13583-13590, 2016.
Fournier et al., "High performance direct ammonia solid oxide fuel cell", Journal of Power Sources, vol. 162, pp. 198-206, 2006.
Gade et al., The effects of fabrication and annealing on the structure and hydrogen permeation of Pd—Au binary alloy membranes, Journal of Membrane Science, vol. 340, pp. 227-233, 2009.
Ganley, Ammonia Fuel Cell Systems:, Ammonia: The Key to a Hydrogen Economy, https://www.slideshare.net/JaccovanEerde/ammonia-full-cell, accessed 2021.
Garagounis et al., "Electrochemical synthesis of ammonia in solid electrolyte cells", Frontiers in Energy Research, vol. 2, Article 1, pp. 1-10, Jan. 2014.
Garcia-Garcia et al., "High purity hydrogen production by low temperature catalytic ammonia decomposition in a multifunctional membrane reactor", Catalysis Communications, vol. 9, pp. 482-486, 2008.
Giddey et al., "Review of electrochemical ammonia production technologies and materials", International Journal of Hydrogen Energy, vol. 38, pp. 14576-14594, 2013.
Gawk et al., "Alkaline Ammonia Electrolysis on Electrodeposited Platinum for Controllable Hydrogen Production", Chem Sus Chem, vol. 9, pp. 403-408, 2016.
Jiang et al., "Eloectrolysis of ammonia for hydrogen production catalyzed by Pt and Pt—Ir deposited on nickel foam", Journal of Energy Chemistry, vol. 23, pp. 1-8, 2014.
Kordali et al., "Electrochemical synthesis of ammonia at atmospheric pressure and low temperature in a solid polymer electrolyte cell", The Royal Society of Chemistry, Chem. Commun, pp. 1673-1674, 2000.
Lan et al., "Synthesis of ammonia directly from air and water at ambient temperature and pressure", Scientific Reports, vol. 3, No. 1144, pp. 1-7, Jan. 29, 2013.
Licht et al., "Ammonia synthesis by N2 and steam electrolysis in molten hydroxide suspensions of nanoscale Fe2O3", Science, vol. 345, Issue 6197, pp. 637-640, Aug. 8, 2014.
Liu et al., "Synthesis of ammonia at atmospheric pressure with Ce0.8M0.2O2-δ (M=La, Y, Gd, Sm) and their proton conduction at intermediate temperature" Solid State Ionics, vol. 177, pp. 73-76, 2006.
Liu et al., "Improved performance of ammonia-fueled solid oxide fuel cell with SSZ thin film electrolyte and Ni-SSZ anode functional layer", International Journal of Hydrogen Energy, vol. 37, pp. 10857-10865, 2012.
Ma et al., "A high-performance ammonia-fueled solid oxide fuel cell", Journal of Power Sources, vol. 161, pp. 95-98, 2006.
Ma et al., "A high-performance ammonia-fueled SOFC based on a YSZ thin-film electrolyte", Journal of Power Sources, vol. 164, pp. 86-89, 2007.
Morgan et al., "Wind-powered ammonia fuel production for remote island: A case study", Renewable Energy, vol. 72, pp. 51-61, 2014.
Murakami et al., "Electrolytic Synthesis of Ammonia in Molten Salts under Atmospheric Pressure", J. Am. Chem. Soc., vol. 125, pp. 334-335, 2003.
Murakami et al., "Electrolytic ammonia synthesis from water and nitrogen gas in molten salt under atmospheric pressure", Electrochimica Acta, vol. 50, pp. 5423-5426, 2005.
Murakami et al., "Electrolytic Synthesis of Ammonia from Water and Nitrogen under Atmosheric Pressure Using a Boron-Doped Diamond Electrode as a Nonconsumable Anode", Electrochemical and Solid-State Letters, vol. 10, No. 4, pp. E4-E6, 2007.
Ni, "Thermo-electrochemical modeling of ammonia-fueled solid oxide fuel cells considering ammonia thermal decomposition in the anode", International Journal of Hydrogen Energy, vol. 36, pp. 3153-3166, 2011.
Skodra et al., "Electrocatalytic synthesis of ammonia from steam and nitrogen at atmospheric pressure", Solid States Ionics, vol. 180, pp. 1332-1336, 2009.
Vitse et al., "On the use of ammonia electrolysis for hydrogen production", Journal of Power Sources, vol. 142, pp. 18-26, 2005.
Wojcik et al., "Ammonia as a fuel in solid oxide fuel cells", Journal of Power Sources, vol. 118, pp. 342-348, 2003.
Xie et al., "An ammonia fuelled SOFC with a BaCe0.9Nd0.1O3-δ thin electrolyte prepared with a suspension spray", Journal of Power Sources, vol. 170, pp. 38-41, 2007.
International Search Report and Written Opinion dated Oct. 14, 2021 pertaining to International application No. PCT/US2021/040481 filed Jul. 6, 2021, 13 pages.
International Search Report and Written Opinion dated Oct. 15, 2021 pertaining to International application No. PCT/US2021/040483 filed Jul. 6, 2021, 15 pages.
Yoon, B. Y. et al. "Effects of infiltrated Sr and Mn doped MlCrO3 on porous La0.8Sr0.2Ga0.8Mg0.2 O3-δ scaffolds used as anodes in solid oxide fuel cells" Solid State Ionics, vol. 249, Aug. 3, 2013, pp. 26-33.
Office Action issued Jan. 4, 2024 in related Japanese Application No. 2023-500367 filed Jul. 6, 2021.
Office Action issued Mar. 1, 2024 in related Japanese Application No. 2023-501251 filed Jul. 6, 2021.

(56) References Cited

OTHER PUBLICATIONS

International Search Report and Written Opinion dated Nov. 4, 2021 pertaining to International application No. PCT/US2021/040466 filed Jul. 6, 2021, 12 pages.
Office Action issued Mar. 21, 2024 in related Japanese Application No. 2023500366 filed Jul. 6, 2021.

* cited by examiner

METHOD FOR PRODUCING COMPRESSED HYDROGEN USING ELECTROCHEMICAL SYSTEMS

CROSS-REFERENCE TO RELATED APPLICATION

This application claims priority to U.S. Provisional Application Ser. No. 63/048,264 filed Jul. 6, 2020, the entire content of which is hereby incorporated by reference.

TECHNICAL FIELD

Embodiments described herein relate generally to methods for producing hydrogen, and more particularly to methods for producing compressed hydrogen from ammonia using a fuel cell.

BACKGROUND

Hydrogen has been studied as a source of energy because it is free of carbon dioxide ($CO_2$), a major component in greenhouse gas (GHG) emissions. However, hydrogen has a low gravimetric energy density and is difficult to handle because of its low liquefaction temperature. Various hydrogen carriers have been studied, and among one of the most promising is ammonia. In particular, ammonia has a low liquefaction pressure at room temperature, and it can be stored and transported efficiently. Additionally, ammonia is $CO_2$-free and has a 17 wt % higher gravimetric hydrogen capacity as compared to other liquid organic hydrogen carriers.

To produce hydrogen from ammonia, however, thermal decomposition is needed. Additionally, the process conventionally includes a pressurization step to pressurize the hydrogen for end use in a hydrogen refueling station. The thermal decomposition and pressurization make the process inefficient and high in operating and capital costs.

SUMMARY

Based on the foregoing, approaches to hydrogen production and compression having improved efficiency may be desired. Various embodiments described herein meet those needs and are directed to methods for production and compression of hydrogen and fuel cells for carrying out the same. In embodiments, the fuel cell includes a cathode, an anode, and a proton-conducting electrolyte disposed between the anode and the cathode. The anode includes an ammonia decomposition catalyst.

According to an embodiment of the present disclosure, a method of producing hydrogen in a fuel cell includes passing ammonia under pressure to an anode of the fuel cell, where the ammonia is decomposed into nitrogen gas and protons. The fuel cell comprises a cathode, the anode, and a proton-conducting electrolyte between the anode and the cathode. The anode includes an ammonia decomposition catalyst. The method further includes passing the nitrogen from the anode, passing the protons through the proton-conducting electrolyte to the cathode, and passing the electrons from the anode to the cathode, wherein the protons and the electrons react to produce substantially pure hydrogen gas under pressure.

These and other embodiments are described in more detail in the following Detailed Description, as well as the appended drawings. The accompanying drawings are included to provide a further understanding of the various embodiments, and are incorporated into and constitute a part of this specification. The drawings illustrate the various embodiments described herein, and together with the description, serve to explain the principles and operations of the claimed subject matter.

BRIEF DESCRIPTION OF THE DRAWINGS

Referring now to the illustrative examples in the drawings.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Figure 1:
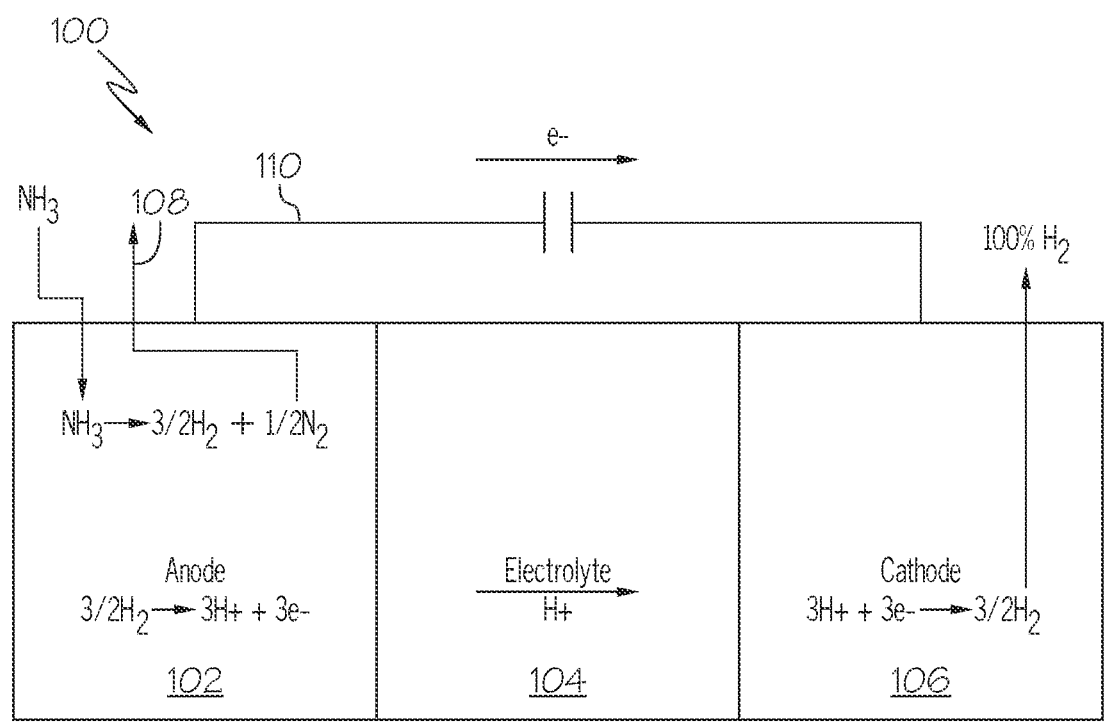
FIG. 1 is an illustration of an example fuel cell according to one or more embodiments shown and described herein.

FIG. 1 illustrates an example fuel cell 100. The fuel cell 100 includes an anode 102, an electrolyte 104, and a cathode 106.

In various embodiments, the anode 102 is formed from perovskite materials, for example, Sr-doped lanthanum ferro-cobaltite (LSCF)-based perovskites, such as $La_{0.6}Sr_{0.4}CoO_{3-\delta}$. Other example anode compositions include Sr-doped lanthanum ferrite (LSF) materials and lanthanum strontium manganite (LSM) materials. In embodiments, the anode 102 is formed from a metal substrate, such as nickel. In embodiments, the anode 102 is a composite formed from nickel and an electrolyte. The electrolyte can be, for example, the same material as that forming the electrolyte 104.

The anode 102 also includes an ammonia decomposition catalyst. The ammonia decomposition catalyst is configured to convert ammonia ($NH_3$) into protons ($H^+$), electrons ($e^-$) and nitrogen gas ($N_2$) in accordance with the following reaction:

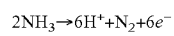

$$2NH_3 \rightarrow 6H^+ + N_2 + 6e^-$$

The protons ($H^+$) generated by the ammonia decomposition catalyst are provided as a feed of protons to the cathode 106 through the electrolyte 104. The nitrogen gas ($N_2$) generated by the ammonia decomposition catalyst is purged from the anode 102 through an outlet 108 in the fuel cell 100. The electrons ($e^-$) are passed to the cathode 106 through an electronic circuit 110.

In various embodiments, the ammonia decomposition catalyst is a metal-based decomposition catalyst. The metal-based decomposition catalyst can be, for example, an ammonia decomposition catalyst based on nickel, cobalt, iron, ruthenium, or combinations thereof.

The electrolyte 104 is a proton-conducting electrolyte that passes the protons from the anode 102 to the cathode 106. The proton-conducting electrolyte can be a solid oxide electrolyte. The proton-conducting electrolyte can include, for example, doped barium cerate or barium zirconate, $SrCeO_3$, $BaZrO_3$, or combinations thereof. Other proton-conducting solid materials known by those in the art are contemplated.

In various embodiments, the cathode 106 includes, for example, perovskite materials, for example, Sr-doped lanthanum ferro-cobaltite (LSCF)-based perovskites, such as $La_{0.6}Sr_{0.4}CoO_{3-\delta}$. Other example cathode compositions include Sr-doped lanthanum ferrite (LSF) materials and lanthanum strontium manganite (LSM) materials. In embodiments, the cathode 106 can be formed from a metal substrate, such as nickel.

Figure 2:
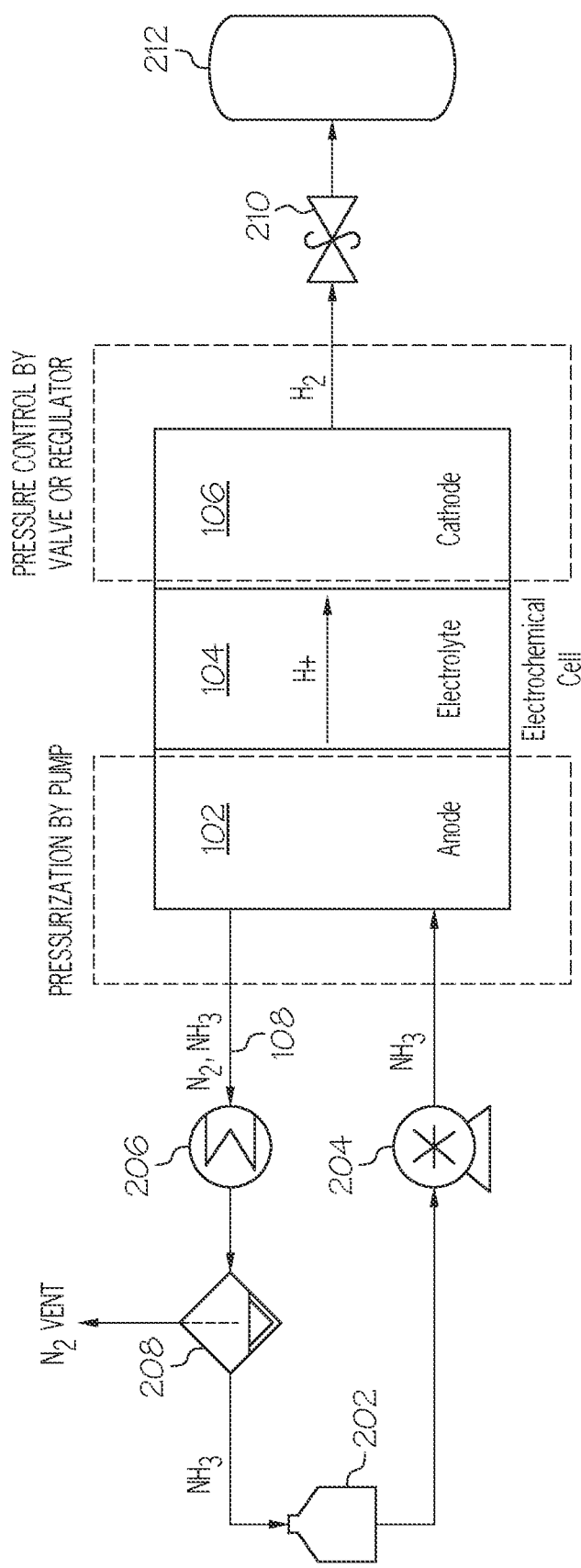
FIG. 2 is another illustration of an example fuel cell according to one or more embodiments shown and described herein.

In operation, an ammonia feed flows ammonia ($NH_3$) into the system under pressure, as shown in FIGS. 1 and 2. For example, as shown in FIG. 2, ammonia can be fed from an ammonia tank 202 through a booster pump 204 and into the anode 102. As the $NH_3$ contacts the anode 102, the ammonia decomposition catalyst breaks the ammonia down into nitrogen gas ($N_2$), protons (H+), and electrons (e–). The nitrogen gas ($N_2$) is purged from the anode with excess ammonia through the outlet 108. As shown in FIG. 2, the $N_2$ and $NH_3$ can be sent through a chiller 206 to a separator 208, where the $N_2$ is purged from the system while the $NH_3$ is returned to the ammonia tank 202.

The protons ($H^+$) travel from the anode 102 through the proton-conducting electrolyte 104 to the pressurized cathode 106, while the electrons are passed to the cathode 106 through the electronic circuit 110. At the cathode 106, the protons ($H^+$) accept the electrons ($e^-$) to yield substantially pure, compressed hydrogen gas ($H_2$) according to the following reaction:

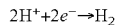

$$2H^+ + 2e^- \rightarrow H_2$$

The electronic circuit 110 uses the flow of electrons to power a device.

The anode 102, the cathode 106, or both the anode 102 and the cathode 106 can be independently pressurized using, for example, a pump, a valve, a regulator, or a combination thereof. In some embodiments, the cathode 106 can be pressurized by a relief valve or a back pressure regulator and the anode 102 can be pressurized by a back pressure regulator at the exhaust line for the nitrogen gas. As shown in FIG. 2, the $H_2$ is passed through a relief valve 210 and into a hydrogen tank 212. In embodiments, the cathode 106 can be pressurized to the set value of the relief valve 210. It should be appreciated that the means for pressurizing the cathode 106, the anode 102, or both the anode 102 and the cathode 106, is not particularly limited, provided that the pressure can be controlled. Without being bound by theory, it is believed that pressure control at the anode 102 can enhance thermodynamic characteristics of the electrochemical reaction. Additionally, it is believed that anode pressurization can mitigate a pressure difference applied to the cell and sealant.

Various embodiments described herein enable single-step separation and compression of hydrogen from ammonia. The single-step separation and compression can drive pressurization of pure $H_2$ without a mechanical compressor, which consumes a large amount of energy, and without an additional process of purification of the $H_2$. Moreover, various embodiments described herein can generate pure $H_2$ from $NH_3$ without the use of a precious metal catalyst, such as platinum, which can be costly and become deactivated at high current densities.

According to an aspect, either alone or in combination with any other aspect, a method of converting ammonia to substantially pure hydrogen gas ($H_2$) in a fuel cell includes passing the ammonia under pressure to an anode of the fuel cell, wherein the fuel cell comprises the anode having an ammonia decomposition catalyst, a cathode, and a proton-conducting electrolyte disposed between the anode and the cathode, and wherein the ammonia is decomposed into nitrogen gas ($N_2$) and protons (H+); purging the nitrogen gas ($N_2$) from the anode; passing the protons ($H^+$) through the proton conducting electrolyte and into the cathode; and passing the electrons ($e^-$) from the anode to the cathode, wherein the protons ($H^+$) accept the electrons ($e^-$) to yield the substantially pure hydrogen ($H_2$) under pressure.

According to a second aspect, either alone or in combination with any other aspect, the proton-conducting electrolyte comprises a solid oxide electrolyte.

According to a third aspect, either alone or in combination with any other aspect, the proton-conducting electrolyte comprises doped barium cerate or barium zirconate.

According to a fourth aspect, either alone or in combination with any other aspect, the ammonia decomposition catalyst comprises a metal-based decomposition catalyst.

According to a fifth aspect, either alone or in combination with any other aspect, the metal-based decomposition catalyst comprises one or more metals selected from the group consisting of nickel, cobalt, iron, ruthenium, and combinations thereof.

According to a sixth aspect, either alone or in combination with any other aspect, wherein the anode comprises a composite of nickel and electrolyte.

According to a seventh aspect, either alone or in combination with any other aspect, the cathode comprises a perovskite.

According to an eighth aspect, either alone or in combination with any other aspect, the perovskite comprises $La_{0.6}Sr_{0.4}CoO_{3-\delta}$.

According to a ninth aspect, either alone or in combination with any other aspect, the anode is pressurized with a pump, a valve, or combinations thereof.

According to a tenth aspect, either alone or in combination with any other aspect, the cathode is pressurized with a pump, a valve, or combinations thereof.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The singular forms "a", "an" and "the" include plural referents, unless the context clearly dictates otherwise.

For the purposes of describing and defining the present disclosure it is noted that the term "about" is utilized in this disclosure to represent the inherent degree of uncertainty that may be attributed to any quantitative comparison, value, measurement, or other representation. The term "about" is also utilized in this disclosure to represent the degree by which a quantitative representation may vary from a stated reference without resulting in a change in the basic function of the subject matter at issue.

As used in this disclosure and in the appended claims, the words "comprise," "has," and "include" and all grammatical variations thereof are each intended to have an open, non-limiting meaning that does not exclude additional elements or steps.

Additionally, the term "consisting essentially of" is used in this disclosure to refer to quantitative values that do not materially affect the basic and novel characteristic(s) of the disclosure. For example, a chemical stream "consisting essentially" of a particular chemical constituent or group of chemical constituents should be understood to mean that the stream includes at least about 99.5% of a that particular chemical constituent or group of chemical constituents.

It should be understood that any two quantitative values assigned to a property may constitute a range of that property, and all combinations of ranges formed from all stated quantitative values of a given property are contemplated in this disclosure.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

The invention claimed is:

1. A method of converting ammonia to hydrogen gas ($H_2$) in a fuel cell comprising:
    passing the ammonia under pressure to a pressurized anode of the fuel cell utilizing a booster pump, wherein the fuel cell comprises the pressurized anode having an ammonia decomposition catalyst, a pressurized cathode, and a proton-conducting electrolyte disposed between the pressurized anode and the pressurized cathode,
    decomposing the ammonia into nitrogen gas ($N_2$), electrons (e−), and protons (H+);
    purging the nitrogen gas ($N_2$) from the pressurized anode utilizing an exhaust line comprising a back pressure regulator;
    passing the protons (H+) through the proton conducting electrolyte and into the pressurized cathode;
    passing the electrons (e−) from the pressurized anode to the pressurized cathode, wherein the protons (H+) accept the electrons (e−) to yield the hydrogen ($H_2$) under pressure; and
    passing the hydrogen under pressure from the pressurized cathode through a relief valve, wherein the combination of the booster pump, the back pressure regulator in the exhaust line, and the relief valve pressurize the pressurized anode and the pressurized cathode.

2. The method according to claim 1, wherein the proton-conducting electrolyte comprises a solid oxide electrolyte.

3. The method according to claim 1, wherein the proton-conducting electrolyte comprises doped barium cerate or barium zirconate.

4. The method according to claim 1, wherein the ammonia decomposition catalyst comprises a metal-based decomposition catalyst.

5. The method according to claim 4, wherein the metal-based decomposition catalyst comprises one or more metals selected from the group consisting of nickel, cobalt, iron, ruthenium, and combinations thereof.

6. The method according to claim 1, wherein the pressurized anode comprises a composite of nickel and electrolyte.

7. The method according to claim 6, wherein the electrolyte of the composite comprises doped barium cerate, doped barium zirconate, $SrCeO_3$, $BaZrO_3$, or combinations thereof.

8. The method according to claim 1, wherein the pressurized cathode comprises a perovskite.

9. The method according to claim 1, further comprising:
    purging excess ammonia along with the nitrogen gas utilizing the exhaust line;
    exposing the nitrogen gas and the excess ammonia to a chiller, thereby forming chilled nitrogen gas and chilled ammonia; and
    separating the chilled ammonia from the chilled nitrogen gas.

10. The method according to claim 9, further comprising recycling the chilled ammonia along with the ammonia to the pressurized anode to form additional nitrogen gas ($N_2$) and protons (H+).

11. The method according to claim 1, wherein the relief valve is connected to a hydrogen tank, such that passing the hydrogen under pressure from the pressurized cathode through the relief valve passing the hydrogen under pressure to the hydrogen tank.

* * * * *